US012762564B2

(12) United States Patent
Garg et al.

(10) Patent No.: US 12,762,564 B2
(45) Date of Patent: Oct. 13, 2026

(54) PAYMENT NETWORK FRAUDULENT CARD IDENTIFICATION LEVERAGING GEOFENCING FOR MULTI-CARD REMEDIATION

(71) Applicant: Bank of America Corporation, Charlotte, NC (US)

(72) Inventors: Saurabh Garg, Faridabad Haryana (IN); Maneesh Sethia, Hyderabad Telangana (IN); Shailendra Singh, Thane West Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 20 days.

(21) Appl. No.: 18/640,035

(22) Filed: Apr. 19, 2024

(65) Prior Publication Data

US 2025/0328907 A1 Oct. 23, 2025

(51) Int. Cl.
*G06Q 20/40* (2012.01)
*G06Q 20/34* (2012.01)

(52) U.S. Cl.
CPC ......... *G06Q 20/4016* (2013.01); *G06Q 20/34* (2013.01); *G06Q 20/4015* (2020.05)

(58) Field of Classification Search
None
See application file for complete search history.

(56) References Cited

U.S. PATENT DOCUMENTS 11,055,594 B1 7/2021 Singh et al.
11,295,310 B2 * 4/2022 Kala .................... G06Q 50/265
2008/0146193 A1 * 6/2008 Bentley ............... H04L 63/0853 455/411
2012/0158590 A1 * 6/2012 Salonen ................. G06Q 20/40 705/44
2013/0290119 A1 * 10/2013 Howe ................ G06Q 20/4015 705/16

* cited by examiner

*Primary Examiner* — Divesh Patel
(74) *Attorney, Agent, or Firm* — Weiss & Arons LLP

(57) ABSTRACT

A method for monitoring transactions for identifying fraudulent activity is provided. The method may include receiving a transaction request at a payment switch interface from a payment network. The method may include comparing the transaction request to all transactions received that are within a predetermined time immediately preceding a timestamp of the time of execution of the transaction request and that include a geolocation that is within a predetermined proximity to the geolocation of the transaction request. In response to the comparing, the method may include identifying a number of transactions greater than a first threshold that are received within the predetermined time and the geolocation is within the predetermined proximity. Following the identifying, the method may include executing a geofencing by restricting transactions from being executed via the smart card and a plurality of smart cards associated with the payment network that are being executed from within the geolocation.

15 Claims, 5 Drawing Sheets

FIG. 5
500
502
504
506
T1
T2
T3
Dynamic Geofencing

PAYMENT NETWORK FRAUDULENT CARD IDENTIFICATION LEVERAGING GEOFENCING FOR MULTI-CARD REMEDIATION

FIELD OF TECHNOLOGY

Aspects of the disclosure relate to providing apparatus and methods for detecting and preventing fraudulent transactions.

BACKGROUND OF THE DISCLOSURE

Fraudulent use of credit cards is an increasing problem in information security. When credit card information is obtained by an unauthorized user, it can easily be used for purchases, credit, and affect the owner's credit score.

Methods are used today to block a purchase that is determined to likely be a fraudulent purchase. However, even when a single credit card is blocked, these methods do not take any preventative measure on other credit card users that may also be at risk.

It would be desirable, therefore, to provide systems and methods for identifying and blocking a potentially fraudulent credit card transaction, both for the affected card and also for other cards that may potentially be at risk as well.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

BACKGROUND OF THE DISCLOSURE

Figure 1:
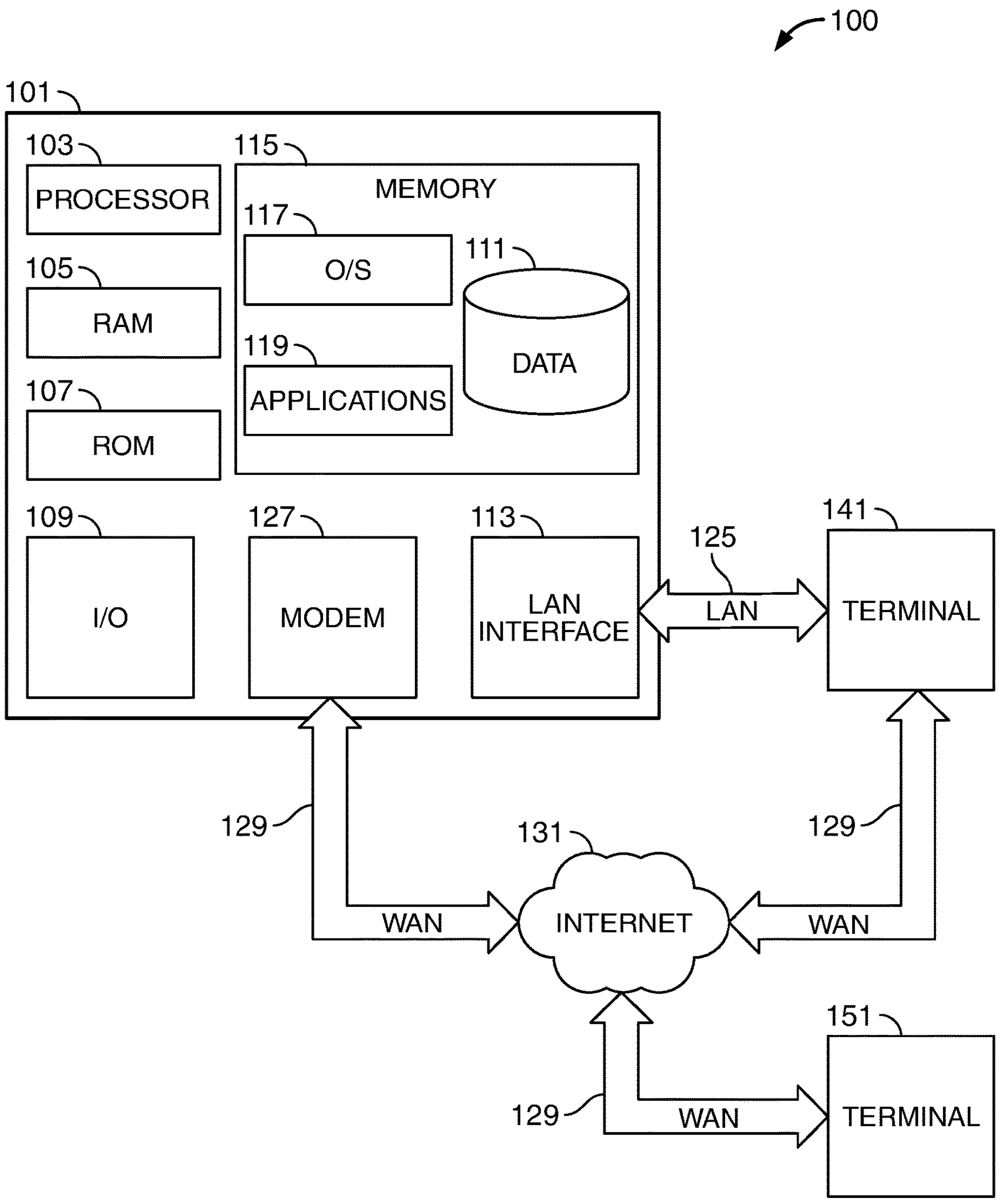
FIG. 1 shows an illustrative system architecture in accordance with principles of the disclosure.

A method for monitoring transactions received by a payment network for identifying fraudulent activity is provided. The method may also enable, in response to the identifying, preventing fraudulent activity from occurring.

Transactions occur at a payment gateway. A payment gateway may be referred to as a point-of-sale ("POS") device. POS devices may include checkout devices in a store, an automated teller machine ("ATM"), an online website accessed via a smart device or any other suitable POS device. When a user executes a purchase using a credit card, the credit card data and the transaction request may be transmitted to a payment network for verification and authentication prior to completing the transaction.

The payment network, in accordance with principles of the disclosure, may transmit each transaction request to a payment switch interface for authentication. The payment switch interface may be configured for monitoring the transaction request for fraudulent activity.

The method may include receiving a transaction request at the payment network. The transaction request may include a timestamp and card identification data associated with a smart card. The timestamp may be a time of execution of the transaction request at a payment gateway, i.e.—POS device. Card identification data may include a card account number, a username, a financial entity associated with the smart card, or any other suitable card identifying data.

The transaction request may be executed via the smart card. The smart card may include a credit card, a digital card or any other suitable payment instrument.

The method may include comparing the transaction request to all transactions received, by the payment network, that were received within a predetermined time immediately preceding the timestamp.

The predetermined time may be a few seconds. The predetermined time may be a minute. The predetermined time may be one minute, five minutes, ten minutes, one hour, or any other suitable predetermined time.

The method may further include comparing the transaction request to all transactions received by the payment network, that were received within a predetermined time immediately preceding the timestamp.

The method may further include comparing the transaction request to all transactions received by the payment network, that may include card identification data that is identical to the card identification data of the transaction request. In some embodiments, the card identification data may be at least substantially similar to the card identification data on the smart card associated with the transaction request.

The method may further include comparing the transaction request to all transactions received by the payment network, that may include a geolocation that is within a predetermined proximity to the geolocation of the transaction request. The geolocation may be determined based on an IP address associated with the transaction request.

In response to the comparing, the method may include identifying a number of transactions where the number of transactions may be greater than a first threshold amount of transactions. The number of transactions identified may include transactions that are received within the predetermined time and that the geolocation is within the predetermined proximity. In some embodiments, the number of transactions identified may also include transactions that include identical card identification data. In some embodiments, the card identification data may at least be substantially similar to one another.

The first threshold amount may be two or more transactions. The first threshold amount may be three transactions. The first threshold amount may be three or more transactions or any other suitable amount.

Following the identifying, the method may include executing a dynamic geofencing on the geolocation associated with the transaction request.

The geofencing may include restricting transactions from being executed via the smart card from within the geolocation. The geofencing may also include restricting transactions from being executed by the smart card in any location. The restricting may be for a limited period of time. The restricting may be implemented until the request to override the restricting is greater than the second threshold amount.

In some embodiments the restricting of transactions may include an area surrounding the geolocation. The area surrounding the geolocation may be a radius of 5 kilometers, 10 kilometers or any other suitable radius.

The geofencing may also include restricting transactions from being executed by a plurality of smart cards that are being executed within the geolocation. The plurality of smart cards may be associated with any one or more users that are executing a transaction from within the geolocation that is restricted. The plurality of smart cards may be associated with the same entity. The plurality of smart cards may be associated with a plurality of entities.

When the smart card is the medium for executing a transaction after restrictions have been generated, the payment network may automatically decline the transaction request received from the smart card from within any geolocation.

When a user attempts to perform a transaction at a payment gateway that is within the restricted geolocation, the payment network, upon receipt of the transaction request, may identify the geolocation as a restricted location and decline execution of the transaction.

In some embodiments, in response to a receipt of a request to execute a transaction from within the geolocation, the method may include executing an override function that may trigger a multi-factor authentication for overriding the geofencing. The multi-factor authentication may include executing a first-factor authentication, a second-factor authentication and a third-factor authentication.

In response to a user of the card providing authenticated responses to the first-factor authentication, the second-factor authentication and the third-factor authentication, overriding the geofencing of the geolocation and executing the transaction.

In response to the user of the card providing unauthenticated responses to one or more of the first-factor authentication, the second-factor authentication and the third-factor authentication, maintaining the restricting of executing the transaction from within the geolocation.

In some embodiments, when a request to override is received by an amount of users greater than a second threshold and each request to override is authenticated, the method may include removing the geofencing of the geolocation and enabling transactions to be performed from the geolocation.

In some embodiments the transaction request may be a first transaction request. Following the geofencing of the location of the first transaction request, the method may include receiving a second transaction request.

In response to a receipt of the second transaction request, the method may include comparing the second transaction request to the first transaction request.

When a geolocation associated with the second transaction request is within a predetermined proximity to the geolocation of the first transaction request, the method may include extending the geofencing of the geolocation to include the geolocation associated with the second transaction request. This may restrict execution of transactions from within the extended geolocation and the geolocation.

In some embodiments, the method may include extending the geofencing when both the card identification data associated with the second transaction request is identical to the card identification data of the first transaction request and the geolocation associated with the second transaction request is not within the predetermined proximity to the geolocation of the first transaction request.

In some embodiments, when a third transaction request, a fourth transaction request and a fifth transaction request are received within a pre-determined time period to the second transaction request and the first transaction request, the method may include extending the geolocation to include each geolocation associated with each of the third transaction request, the fourth transaction request and the fifth transaction request.

In some embodiments, a bot may be executing the transactions. Fraudsters may get a hold of card identification data. The bot may be used to execute each transaction. The bot and server executing the transactions may be located in one location with a first IP address. The bot may be enabled to execute multiple transactions using a different IP address for each transaction request. The fraud detection engine may detect numerous transactions occurring within close timing using different IP addresses. This may be an indication of fraud.

Additionally, when each geolocation is different than the geolocation of the first transaction request and the second transaction request and the card identification data is identical, the method may include geofencing each of the geolocations associated with the third, fourth and fifth transaction request.

A system for monitoring transactions for identifying fraudulent activity is provided. The system may include a payment network. The payment network may be configured to receive a transaction request from a payment gateway. The payment gateway may be a POS device. The payment gateway may be an ATM. The payment gateway may be an online website.

The system may include a payment switch accessed via a payment switch interface. The payment switch may be hosted by a central server. The payment switch may be in electronic communication with the payment network for processing transactions.

The execution of fraud detection at the payment switch interface, which is the core level of the payment transaction processing, may enable detecting the fraud at an earlier stage that may enable, in real-time, detecting the fraud and further preventing additional fraudulent activity.

The payment switch may be configured to receive the transaction request from the payment network. The transaction request may include a timestamp. The transaction request may include card identification data associated with the smart card. The transaction request may be executed via the smart card.

The payment switch may execute a fraud detection engine. The fraud detection engine may be configured to retrieve geolocation coordinates of a location where the transaction is executed. The fraud detection engine may also be configured to retrieve an IP address of a source of the transaction request. In some embodiments, the geolocation coordinates may be derived based on the IP address.

The fraud detection engine may execute a fraud transaction timestamp recorder to generate a transaction timestamp. The timestamp may be a time of an execution of the transaction request.

The fraud detection engine may be configured to compare the transaction request to all transactions received, by the payment network that may have been received, by the payment network, within a predetermined time immediately preceding the timestamp.

The fraud detection engine may further be configured to compare the transaction request to all transactions received by the payment network that may include card identification data that may be identical, or at least substantially similar, to the card identification data of the transaction request.

The fraud detection engine may further be configured to compare the transaction request to all transactions received by the payment network that may include a geolocation that is within a predetermined proximity to the geolocation of the transaction request.

In response to the comparing, the fraud detection engine may be configured to identify a number of transactions that may be greater than a first threshold. The number of transactions identified may include transactions that may be received within the predetermined time and that the geolocation is within the predetermined proximity.

Following the identifying, the fraud detection engine may be configured to execute a dynamic geofencing on the geolocation associated with the transaction request.

The geofencing may include transmitting a first instruction to the payment network. The first instruction may restrict transactions from being executed via the smart card from within the geolocation associated with the transaction request.

The geofencing may also include transmitting a second instruction to the payment network. The second instruction may restrict transactions from being executed by a plurality of smart cards associated with the payment network that may be executed within the geolocation. The payment network, upon receipt of a transaction request that is executed from within the geolocation, may automatically decline the transaction request.

The payment network may be configured to, in response to a receipt of a request to execute a transaction from within the geolocation, execute an override function. The override function may overwrite the restriction(s) when one or more protocol may be met.

The override function, upon execution, may trigger a multi-factor authentication for overriding the geofencing. The multi-factor authentication may include executing a first-factor authentication, a second-factor authentication and a third-factor authentication.

In some embodiments, the first-factor authentication and the second-factor authentication may be executed at the time of the receipt of the transaction request, via the payment gateway. The third-factor authentication may then be executed in response to receipt of the request to override the geofencing.

In some embodiments, the first-factor authentication, the second-factor authentication and the third-factor authentication may all be executed at the time of receipt of the request to override.

The payment network may be configured to, in response to a user of the smart card providing authenticated responses to the first-factor authentication, the second-factor authentication and the third-factor authentication, override the geofencing of the geolocation and executing the transaction.

When the user of the smart card provides unauthenticated responses to one or more of the first-factor authentication, the second-factor authentication and the third-factor authentication, the payment network may be configured to maintain the restricting of executing the transaction from within the geolocation.

The system may monitor all transactions occurring within the area that is being restricted from transactions. The system may monitor the number of override requests being received in response to transactions being denied within the geolocation. When a number of override requests identified as being authentic and not fraudulent override the percentage of fraud, the system may remove the restrictions from within the geolocation.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein. Computer 101 may include the payment gateway, the payment network, the payment switch interface, the smart card, one or more mobile devices hosting a digital credit card and any other computing device described herein. Computer 101 may include the communications server. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include an environment 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 501, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications embedded within the payment network 306, payment switch interface 410 including the fraud detection engine 412, swiftness fraud transaction timestamp record 424, and instructions and algorithms associated with and/or embedded within the STM 406.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
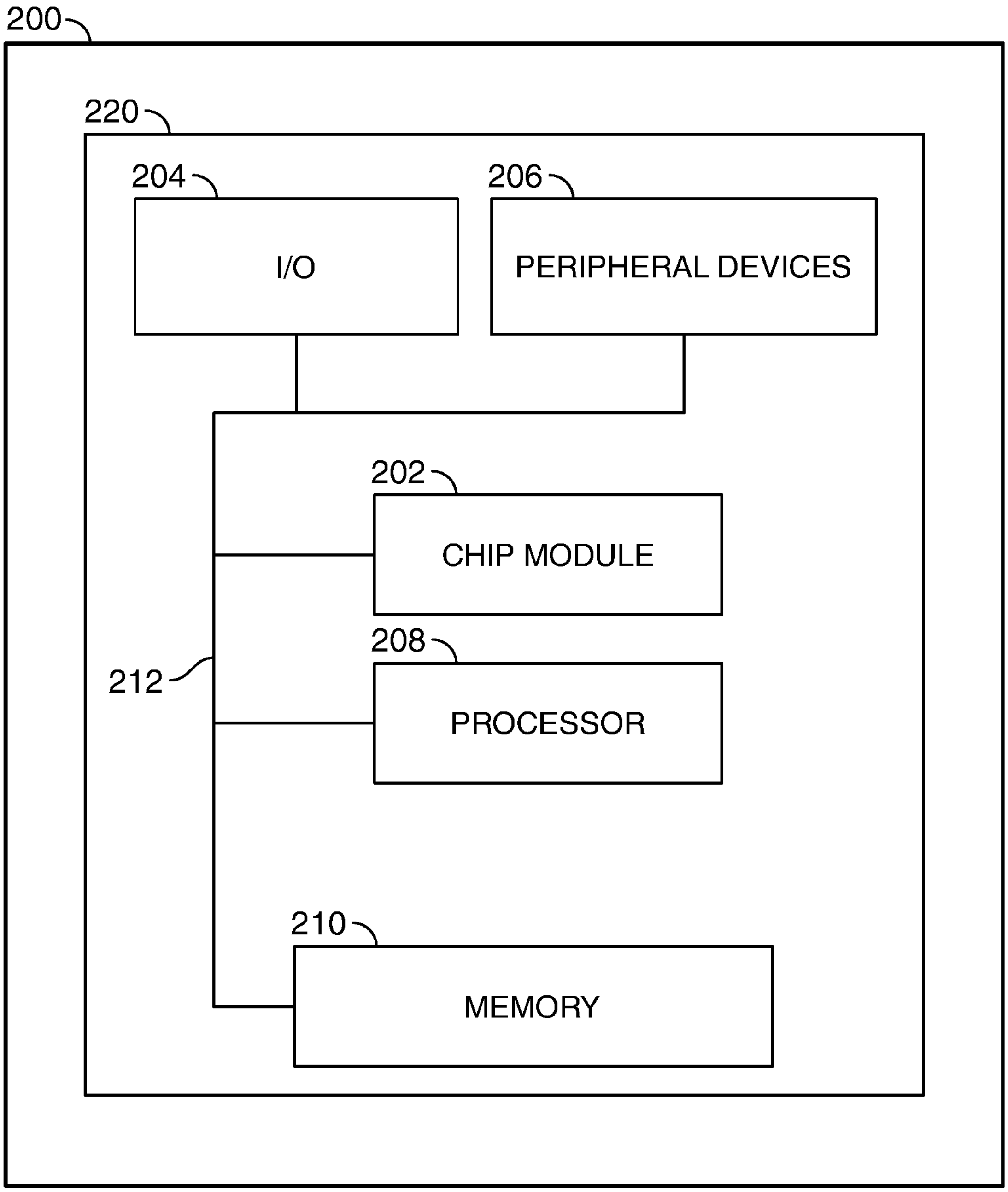
FIG. 2 shows an illustrative diagram in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data, and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
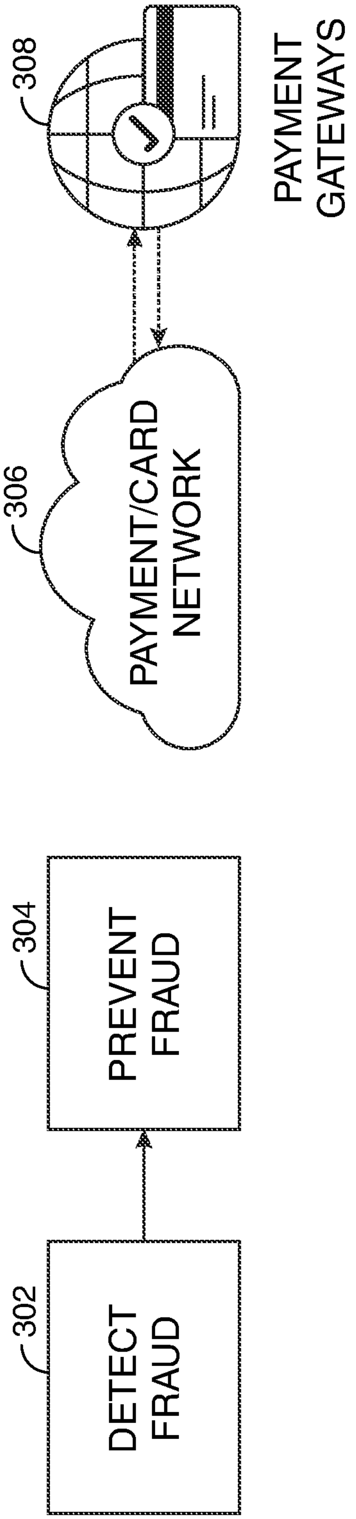
FIG. 3 shows an illustrative exemplary diagram in accordance with principles of the disclosure.

FIG. 3 shows an illustrative diagram of the fraud detection methods in accordance with principles of the disclosure.

The transactions executed at a payment gateway 308 may be transmitted to the payment card network 306. Payment card network 306 may, leveraging a payment switch interface, detect fraud occurring in real-time transactions being executed as shown at 302 and may additionally prevent additional fraud, as shown at 304.

Figure 4:
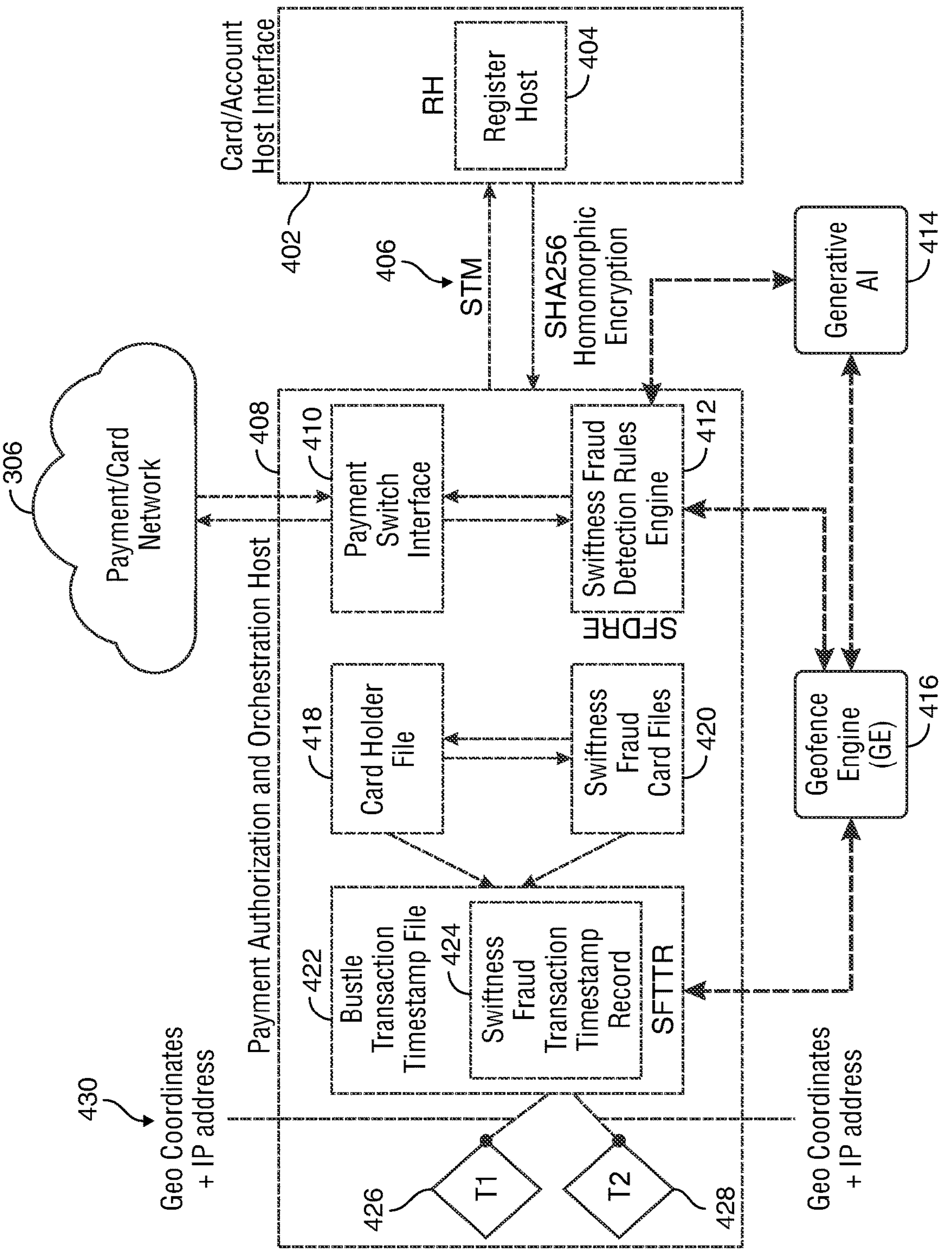
FIG. 4 shows illustrative exemplary flow diagram in accordance with principles of the disclosure.

FIG. 4 shows an exemplary diagram of detecting and preventing fraud in accordance with principles of the disclosure.

Transactions occurring at a POS device may be transmitted to payment network 306 for authenticating, processing and executing. Payment network 306 may leverage a payment switch 410 for the processing. Payment switch interface 410 may communicate with the merchant and the payment service provider for each transaction. The payment switch interface may be leveraged, in real-time, to monitor each transaction for identification of fraud.

In this exemplary diagram Card/Account host interface 402 may be the payment gateway where a transaction is executed. Register host 404 may register where the transaction is being initiated. The transaction request may be transmitted from register host 404 to payment authorization and orchestration host 408, i.e.—payment network.

STM 406 may be a medium for transmitting the transactional data from the register host to the payment switch. This may be a secure channel to read and write the transactional data to shared memory. The data may be transmitted in encrypted form, i.e.—homomorphic encryption.

Payment switch interface 410 may use swiftness fraud detection rules engine ("SFDRE") 412 for monitoring the transactions. SFDRE 412 may monitor to detect a pattern that may indicate fraud. Generative artificial intelligence ("AI") 414 may be used to detect the patterns.

Each transaction received at payment switch interface 410 may receive a timestamp via swiftness fraud transaction timestamp record ("SFTTR") 424. Bustle transaction timestamp file 422 may store the timestamp for each transaction received. This may be used in detecting patterns of transactions that may link to fraud.

Each transaction request received may be stored at card holder file 418. Each transaction request stored may include card identification data and a bit number relating to the financial institution associated with the card executing the transaction. Transaction request(s) that may be identified as fraud may be transferred to swiftness fraud card files 420. Each transaction request stored at 420 may be locked from being executed.

SFDRE may leverage geofence engine 416 to extract an IP address and geo coordinates 430 associated with each transaction.

Upon identification of the location of the transaction, SFDRE 412 may extract the timestamp of the time of execution of the transaction via SFTTR 424 and the card identification data from card holder file 418. This data may be compared to previously received transactions stored at card holder file 418.

SFDRE 412 may execute the comparison using AI to detect patterns indicating fraud. SFDRE 412 may search for transactions stored at card holder file 418 that were received, by the payment network, within a predetermined time immediately preceding the timestamp of the transaction being monitored. For each transaction that is identified to be received within the predetermined time, SFDRE 412 may search those transaction to identify transactions that include card identification data that is identical to the card identification data of the transaction request and that may include a geolocation that is within a predetermined proximity to the geolocation of the transaction request.

When a number of transactions are identified that are greater than a first threshold T1 426, threshold T2 428 may be triggered. When threshold T2 428 is triggered, a geofencing of the location of the transaction may be executed.

When the number of transactions is not greater than the first threshold T1 426, the transaction being monitored may be stored at card holder file 418 and the geofencing may not be executed.

Figure 5:
FIG. 5 shows an illustrative exemplary diagram in accordance with principles of the disclosure.

FIG. 5 shows an illustrative exemplary diagram of a geofencing of one or more areas that fraud may be detected in accordance with principles of the disclosure.

In this diagram, three different locations of fraud may be detected. At the time of detection, a dynamic geofencing may be executed. Each identification may execute a geofencing around the area of the identification of fraud.

T1, at 502, may be a first location of fraud detection. The illustrative dotted line extending from location T1 at 502 may be the area bound by T1 that may be included in the area of geofencing. A second location of fraud may be shown at T2, 504. When a second identification of fraud is detected following the first location, a second geofencing is executed at T2 and the area bound by T2 may be illustrated by dotted lines. When a third identification of fraud is detected following the first and second location, a third geofencing may be executed as shown at T3, 506. The area bound by T3 may be illustrated as a bold line.

In some embodiments, all transactions executed from any of the geofencing areas of T1, T2 and T3, may be declined for the predetermined time period.

Thus, systems and methods for monitoring transactions received by a payment network for identifying fraudulent activity is provided. Persons skilled in the art will appreciate that the present invention can be practiced by other than the described embodiments, which are presented for purposes of illustration rather than of limitation.

What is claimed is:

1. A method for detecting and preventing fraudulent activity associated with transactions received by a payment network, the method comprising:

receiving at a payment switch interface, a transaction request from the payment network, the transaction request including a timestamp and card identification data associated with a smart card, the transaction request executed via the smart card;

executing, via a fraud detection engine running at the payment switch interface, a fraud detection application for early detection of a probability of fraud associated with the transaction request, the executing comprising:

tracing an IP address of a source of the transaction request;

using the IP address, deriving geolocation coordinates of a location where the transaction request is requested;

comparing the transaction request to all transactions received by the payment network, the comparing for identifying transactions:

received within a predetermined time immediately preceding the timestamp;

that comprise card identification data that is identical to the card identification data of the transaction request; and that comprise geolocation coordinates that are within a predetermined proximity to the geolocation coordinates of the transaction request;

in response to the comparing, identifying a number of transactions greater than a first threshold that are received within the predetermined time and the geolocation coordinates are within the predetermined proximity to the geolocation coordinates of the location where the transaction request is requested;

prior to declining the transaction request, triggering a multi-factor authentication for authenticating a user of the smart card, the multi-factor authentication comprising executing each of a first-factor authentication, a second-factor authentication and a third-factor authentication;

in response to a receipt of an unauthenticated response to at least one or more of the first-factor authentication, the second-factor authentication and the third-factor authentication:

executing a dynamic geofencing around the geolocation coordinates of the location of the transaction request, the dynamic geofencing comprising:

declining, via the payment network, execution of transaction requests received from the smart card within the geolocation coordinates of the location of the transaction request; and declining, via the payment network, execution of transaction requests received from a plurality of smart cards associated with the payment network that are that are within the geolocation coordinates of the location of the transaction request;

following the executing, monitoring transaction requests received within the geolocation coordinates of the location of the transaction request;

receiving a plurality of requests to override the geofencing;

re-executing the multi-factor authentication for authenticating the user transmitting the plurality of requests to override; and in response to receiving a number of override requests greater than a second threshold and that are determined to be authentic, overriding the geofencing around the geolocation coordinates of the location.

2. The method of claim 1 wherein the declining of transaction requests from within the geolocation includes declining of the transaction requests from within an area bound by the geolocation.

3. The method of claim 2 wherein the area surrounding the geolocation is a radius of 10 kilometers.

4. The method of claim 1 wherein the declining transaction requests comprises declining transaction requests for a predetermined period of time.

5. The method of claim 1 wherein the transaction request is a first transaction request and the method comprises, following the geofencing, receiving a second transaction request.

6. The method of claim 5 further comprising:

comparing the second transaction request to the first transaction request; and when a geolocation associated with the second transaction request is within a predetermined proximity to the geolocation of the first transaction request, extending the geofencing of the geolocation to include the geolocation associated with the second transaction request.

7. The method of claim 6 wherein when card identification data associated with the second transaction request is identical to the card identification data of the first transaction request and the geolocation associated with the second transaction request is not within the predetermined proximity to the geolocation of the first transaction request, the method comprises executing a geofencing of the geolocation associated with the second transaction request.

8. The method of claim 7 further comprising:

when a third transaction request, a fourth transaction request and a fifth transaction request are received within a pre-determined time period to the second transaction request and the first transaction request; and the geolocation associated with each of the third transaction request, the fourth transaction request and the fifth transaction request is different from the geolocation of the first transaction request and the second transaction request:

geofencing each geolocation associated with the third, fourth and fifth transaction request.

9. The method of claim 1 wherein the predetermined proximity is a distance not greater than ten kilometers.

10. The method of claim 1 wherein the first threshold is three transactions.

11. A system for monitoring transactions for identifying fraudulent activity, the system comprising:

a payment network configured to receive a transaction request from a payment gateway;

a payment switch accessed via a payment switch interface, the payment switch hosted by a central server, the payment switch in electronic communication with the payment network to process transactions, the payment switch accessed via a payment switch interface, the payment switch configured to, receive the transaction request from the payment network, the transaction request including a timestamp and card identification data associated with a smart card, the transaction request executed via the smart card, the payment switch comprising:

a fraud detection engine for executing a fraud detection application for early detection of a probability of fraud associated with the transaction request, the fraud detection engine configured to:

trace an IP address of a source of the transaction request;

using the IP address, derive geolocation coordinates of a location where the transaction request is requested;

retrieve geolocation coordinates and an IP address of a source of the transaction request;

create a timestamp of a time of an execution of the transaction request;

compare the transaction request to all transactions received, by the payment network, to identify transactions that:

were received, by the payment network, within a predetermined time immediately preceding the timestamp;

comprise card identification data that is identical to the card identification data of the transaction request; and comprise a geolocation that is within a predetermined proximity to the geolocation of the transaction request;

in response to the comparing, identify a number of transactions greater than a first threshold that are received within the predetermined time and the geolocation is within the predetermined proximity to the geolocation coordinates of the location where the transaction request is requested;

prior to declining the transaction request, trigger a multi-factor authentication for authenticating a user of the smart card, the multi-factor authentication comprising, executing each of a first-factor authentication, a second-factor authentication and a third-factor authentication; and in response to a receipt of an unauthenticated response to at least one or more of the first-factor authentication, the second-factor authentication and the third-factor authentication:

execute a dynamic geofencing on the geolocation associated with the transaction request, the geofencing comprising:

transmitting a first instruction to the payment network, the first instruction declining transaction requests from being executed via the smart card from within the geolocation; and transmitting a second instruction to the payment network, the second instruction declining transaction requests from being executed by a plurality of smart cards associated with the payment network that are being executed within the geolocation;

following the executing, monitoring transaction requests received within the geolocation coordinates of the location of the transaction request;

in response to declining transaction requests received within the geolocation, receiving a plurality of requests to override the geofencing;

re-executing the multi-factor authentication for authenticating the user requesting the override; and in response to receiving a number of override requests greater than a second threshold and that are determined to be authentic, overriding the geofencing around the geolocation coordinates of the location.

12. The system of claim 11 wherein the fraud detection engine uses generative artificial intelligence ("AI") for execution of the comparing.

13. The system of claim 11 wherein the transaction request is transmitted and processed using software transactional memory ("STM").

14. The system of claim 11 wherein the plurality of smart cards are each associated with one user.

15. The system of claim 11 wherein the plurality of smart cards are each associated with a different user.

* * * * *